(12) United States Patent
Patel et al.

(10) Patent No.: US 7,656,819 B2
(45) Date of Patent: Feb. 2, 2010

(54) METHOD AND APPARATUS FOR IMPROVING CONVERGENCE IN NETWORKS

(75) Inventors: Keyur Patel, San Jose, CA (US); Chandrashekhar Appanna, Cupertino, CA (US); John Scudder, Ann Arbor, MI (US)

(73) Assignee: Cisco Technology, Inc., San Jose, CA (US)

( * ) Notice: Subject to any disclaimer, the term of this patent is extended or adjusted under 35 U.S.C. 154(b) by 559 days.

(21) Appl. No.: 11/267,865

(22) Filed: Nov. 4, 2005

(65) Prior Publication Data

US 2007/0104106 A1    May 10, 2007

(51) Int. Cl.
*H04L 12/28*    (2006.01)
*H04L 12/56*    (2006.01)
*H04J 3/16*    (2006.01)
*H04J 3/22*    (2006.01)

(52) U.S. Cl. .................. 370/254; 370/389; 370/401; 370/471

(58) Field of Classification Search ................. 370/254, 370/351, 389, 471
See application file for complete search history.

(56) References Cited

U.S. PATENT DOCUMENTS 6,553,423 B1 * 4/2003 Chen .......................... 709/230

2005/0025118 A1 * 2/2005 Hao et al. .................... 370/351
2006/0171331 A1 * 8/2006 Previdi et al. ............... 370/254

OTHER PUBLICATIONS

Rekhter, Y., "A Border Gateway Protocol 4 (BGP-4)," Network Working Group of the Internet Engineering Task Force, Mar. 1995, pp. 1-54.
White, R., "Graph Overlays on Path Vector: A Possible Next Step in BGP," The Internet Protocol Journal (Cisco Systems, Inc., San Jose, CA), vol. 8, No. 2, Jun. 2005, pp. 13-21.
Doyle Jeff, Cisco Systems, Inc., CCIE Professional Development, "Routing TCP/IP" vol. II, ciscopress.com, 2001.

* cited by examiner

*Primary Examiner*—Daniel J Ryman
*Assistant Examiner*—Nishant B Divecha
(74) *Attorney, Agent, or Firm*—Hickman Palermo Truong & Becker LLP

(57) ABSTRACT

A method of improving convergence in networks that use path vector protocols. In one embodiment using Border Gateway Protocol (BGP) for inter-domain route and reachability communication, nodes that need to remove routes using EBGP NLRI announcements send BGP WITHDRAW messages containing a new route originator attribute that identifies an originator of a specified withdrawn route. A receiving node removes the specified route from its routing information base (RIB), and matches the originator to other paths in the RIB. Matching paths are marked as ineligible for consideration in a best path computation, thereby preventing the use of routes that are unreachable but not yet withdrawn by an originating node. The approach causes faster BGP convergence, reduces unnecessary route flapping, and alleviates unnecessary route dampening.

30 Claims, 6 Drawing Sheets

---

302 RECEIVE BGP WITHDRAW MESSAGE WITH ROUTE ORIGINATOR ATTRIBUTE

↓

304 REMOVE NLRI REQUESTED IN MESSAGE FROM LOCAL BGP RIB

↓

306 MATCH ROUTE ORIGINATOR ATTRIBUTE VALUES TO PATHS IN RIB

↓

308 MARK MATCHING PATHS AS TEMPORARILY INELIGIBLE FOR CONSIDERATION IN BEST PATH COMPUTATION

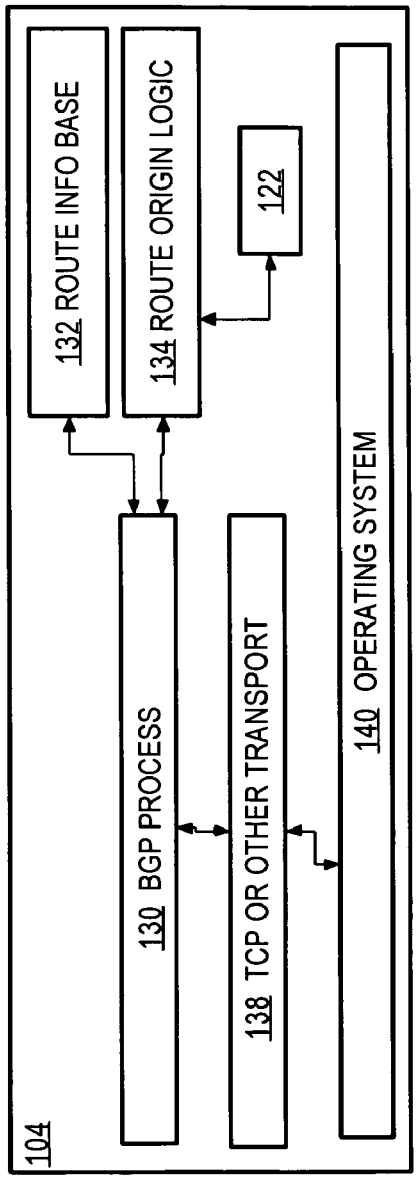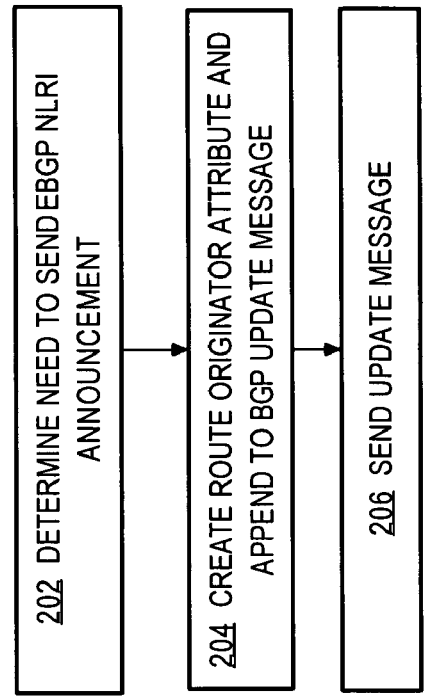

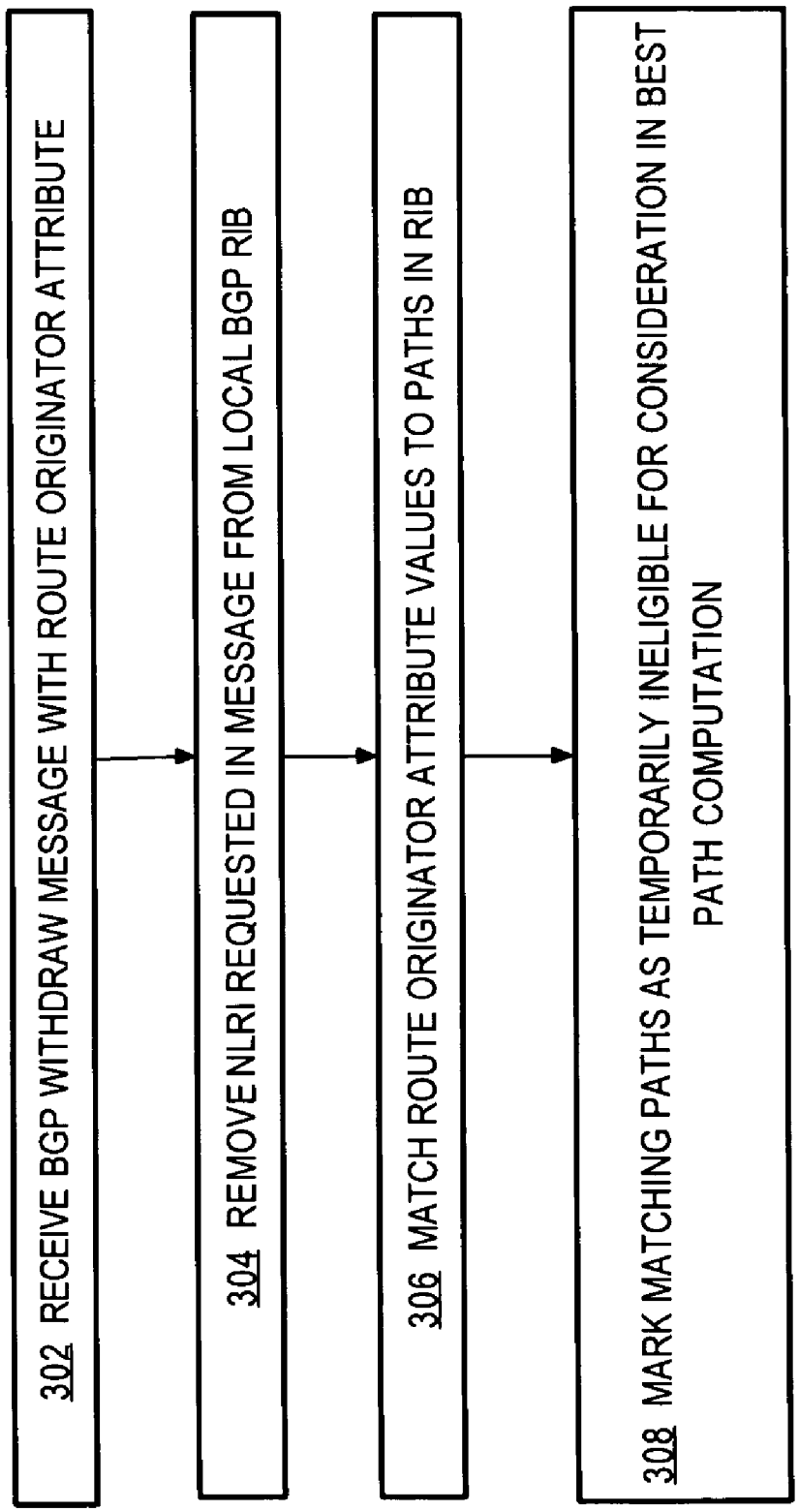

US 7,656,819 B2

METHOD AND APPARATUS FOR IMPROVING CONVERGENCE IN NETWORKS

FIELD OF THE INVENTION

The present invention generally relates to computer networks. The invention relates more specifically to methods for performing convergence in network elements that use the Border Gateway Protocol (BGP).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An Autonomous System (AS) is a network or group of networks under common administration and with common routing policies. A typical example of autonomous system is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

Usually, an autonomous system comprises network elements that are established on the edge of the system, and that serve as the system's ingress and egress points for network traffic. These network elements often, but not always, are routers and are referred to as Provider Edge (PE) network elements or as Autonomous System Border Routers (AS-BRs). An autonomous system may also include other network elements that are not used as ingress or egress points for network traffic, and these network elements are referred to as provider network elements. Similarly, a customer network may comprise network elements that are established on the edge of the network, and that are referred to as Customer Edge (CE) network elements.

In order to facilitate the routing of network traffic through one or more autonomous systems, the network elements of the autonomous systems need to exchange routing information to various network destinations. Border Gateway Protocol (BGP) is an exterior gateway protocol (EGP) that is used to exchange routing information among network elements (usually routers) in the same or different autonomous systems. A computer host that executes a BGP process is typically referred to as a BGP host or a BGP device.

In order to exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The BGP routing information includes the complete route to each network destination that is reachable from a BGP host. A route comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

In another example, Virtual Private Network (VPN) addressing schemes may use a route distinguisher (RD) in addition to the address prefix in order to distinguish between different routes to the same address destination. For example, in a VPN address destination of "10:9.2.0.2/16", "10" is a route distinguisher that identifies a specific VPN route to the "9.2.0.2/16" network.

The information that describes the path to the address destination in a BGP route includes, but is not limited to, an ORIGIN attribute, an AS_PATH attribute, and a NEXT_HOP attribute. The ORIGIN attribute indicates how a BGP process learned about a particular route. The value of the ORIGIN attribute for a particular route may indicate that the route was learned from an Interior Gateway Protocol (IGP), from an EGP, such as external BGP (eBGP), or that the origin of the route is unknown or learned in some other way.

The AS_PATH attribute indicates the list of autonomous systems that must be traversed in order to reach the address destination. For example, an AS_PATH attribute of "130 120" for a route indicates that the route to the address destination passes through autonomous systems 120 and 130 in that order.

The NEXT_HOP attribute for a particular route contains the address of a network element that is the next hop to the address destination. For example, the NEXT_HOP attribute for a route that is received from an eBGP peer is the network address of the eBGP peer. In another example, a PE BGP host that advertises a VPN route will include its own network address as the NEXT_HOP attribute for the VPN route it advertises.

BGP peers exchange, or advertise, routes in BGP UPDATE messages. Under the BGP-4 standard described in RFC1771, which was published by the Internet Engineering Task Force (IETF) in March 1995 and which defines the mechanism for exchanging IPv4 routes, a BGP UPDATE message includes a message header, and some or all of the following fields:

(1) Unfeasible Routes Length—the length of the Withdrawn Routes field;

(2) Withdrawn Routes—the address prefixes of the routes being withdrawn from service;

(3) Total Path Attribute Length—the length of the Path Attribute field;

(4) Path Attributes—the attributes of the routes advertised in the BGP UPDATE message including, but not limited to, the NEXT_HOP attribute, the ORIGIN attribute, and the AS_PATH attribute;

(5) Network Layer Reachability Information (NLRI)—the address prefixes of feasible routes being advertised in the BGP UPDATE message.

In BGP-4, feasible, or reachable, routes are advertised between BGP peers in a BGP UPDATE message. The BGP UPDATE message carries the address prefixes of the routes in the NLRI field of the message. The different attributes of the routes, such as the ORIGIN, NEXT_HOP, and AS_PATH attributes are carried in the Path Attribute field of the BGP UPDATE message. All routes advertised in the same BGP UPDATE message share the same path attributes.

When a BGP host determines that a particular address destination is unavailable for whatever reason, the BGP host must withdraw all routes it has advertised as reachable through this unavailable address destination. The BGP host withdraws the routes by sending a BGP UPDATE message to its BGP peers. The BGP UPDATE message includes all the address prefixes of the routes being withdrawn in the Withdrawn Routes field as <length,prefix> tuples, where <length> is the length in bits of the associated <prefix>. The Unfeasible Routes Length field of the BGP UPDATE message includes the total length of the Withdrawn Routes field. The Path Attributes field and the NLRI field are blank or not included in the message. Thus, under the BGP-4 standard, in order to withdraw the unfeasible routes, a BGP host must include in the BGP UPDATE message all of the prefixes of the routes being withdrawn.

The Exterior Border Gateway Protocol (EBGP) is widely used in network nodes, such as routers and switches, for communicating paths or routes and associated network reachability information across autonomous systems or domains. In EBGP, a node communicates, to other peer nodes in an internetwork, information about new routes or paths that the node can reach using BGP UPDATE messages. Each node builds a local route information base (RIB) that contains a complete current map of the network. If a route or path becomes unavailable, then the node removes the route from the RIB and informs other nodes using a BGP WITHDRAW message.

In some cases, a node may be authorized to send BGP WITHDRAW messages about routes that a different node (the "originator node") originally announced in the network using a prior UPDATE message. However, BGP WITHDRAW messages do not identify originator nodes.

In a network with a large number of nodes, propagation of the BGP WITHDRAW message to all interested nodes may take a considerable period of time.

A node that receives a BGP WITHDRAW message responds by executing the well-known BGP bestpath algorithm, using the remaining paths in its route database, to select an alternate route to reach destination nodes that the router formerly could reach using the withdrawn route. While executing the bestpath algorithm, the node may generate and send one or more BGP UPDATE messages to peer nodes. However, the BGP UPDATE messages might reference paths or routes that are unreachable as a result of removal of the withdrawn route, but still present in the database of the node because of latency in propagation of the WITHDRAW message.

Once the WITHDRAW message has fully propagated, nodes that have received UPDATE messages referencing unreachable routes will reply by sending further UPDATE messages that resolve the abnormality and provide new reachability information based on loop detection and other mechanisms performed at the receiving node. Thus, a disadvantage of current practice is that propagation delays for WITHDRAW messages result in the transmission of many unnecessary UPDATE messages. Moreover, the current approach may trigger receiving nodes to perform route dampening, which involves limiting use of routes that appear to be undergoing repeated addition and withdrawal. Triggering route dampening may adversely affect the time required to perform route convergence in a BGP node.

Based on the foregoing, there is a clear need for improvements in convergence approaches in networks.

There is a particular need for a better way to process BGP WITHDRAW messages that are used to communicate inter-domain route changes.

Although the preceding description has focused on BGP in the inter-domain context as an example, the problems described above are found in other path vector protocols.

Thus, there is a need to address the foregoing problems in a way that is applicable to path vector protocols other than BGP.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram of a software architecture of a network node that implements the approaches herein;

FIG. 2A is a flow diagram that illustrates a high level overview of one embodiment of a method for sending an update message with a route originator attribute;

FIG. 3 is a flow diagram that illustrates a high level overview of one embodiment of a method of processing, at a receiving node, a withdraw message with a route originator attribute;

DETAILED DESCRIPTION

Figure 1A:
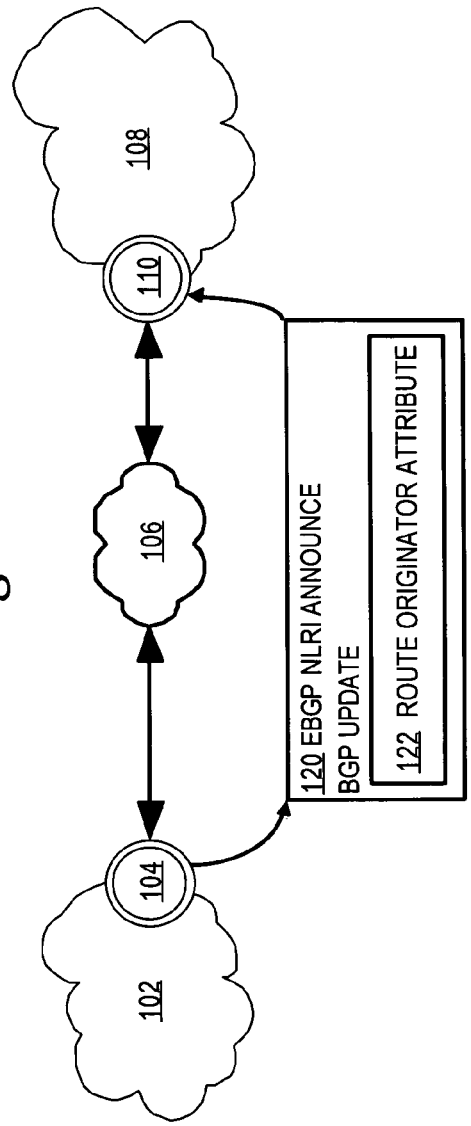
FIG. 1A is a block diagram of an example network context in which an embodiment may be used.

A method and apparatus for improving convergence in networks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Approaches For Improving Convergence In Networks
   2.1 Structural Elements
   2.2 Functional Approaches
      2.2.1 Sending Update Messages
      2.2.2 Sending Route Withdrawal Messages
      2.2.3 Processing Route Withdrawal Messages
      2.2.4 Service Provider Business Model
3.0 Implementation Mechanisms—Hardware Overview
4.0 Extensions and Alternatives 1.0 General Overview The needs identified in the foregoing Background, and other needs and objects that will become apparent for the following description, are achieved in the present invention, which comprises, in one aspect, a method for improving convergence in networks comprising the steps of receiving a Border Gateway Protocol (BGP) WITHDRAW message that includes a route originator attribute identifying a node that originated a withdrawal of network layer reachability information, wherein the route originator attribute includes one or more path identifier values; removing the network layer reachability information from a local BGP route information base; electronically matching the one or more path identifier values from the route originator attribute to one or more paths in the route information base to result in identifying one or more matching paths; and electronically marking the one or more matching paths as ineligible for consideration in a best path determination.

In one feature of this aspect, the one or more matching paths are marked as eligible for consideration in the best path determination if the one or more matching paths have not been withdrawn from the route information base after expiration of a timer.

In another feature, a network node sends a BGP UPDATE message with the route originator attribute whenever the network node needs to send an exterior BGP (EBGP) NLRI update message. In yet another feature, a first network node sends the BGP WITHDRAW message with the route originator attribute whenever the network node needs to send an EBGP NLRI withdrawal message to a neighbor BGP node that is known to implement the steps of the method. In a related feature, the first network node determines that the neighbor BGP node implements the steps of the method by negotiating one or more BGP capabilities with the neighbor BGP node at a time when the first network node establishes a BGP peering session with the neighbor BGP node.

In still another feature, the route originator attribute comprises an EBGP identifier value, an autonomous system path value, and a confederation identifier, wherein the EBGP identifier value identifies a particular node that originated NLRI, wherein the autonomous system path value identifies a path to the particular node, and the confederation identifier identifies a confederation of which the particular node is a part. In a further feature, the route originator attribute comprises a plurality of type-length-value tuples, wherein each of the tuples comprises an EBGP identifier value, an autonomous system path value, and a confederation identifier.

In another aspect, the invention provides a method of improving convergence in networks that use path vector protocols. In one embodiment, using Border Gateway Protocol (BGP) for inter-domain route and reachability communication, nodes that need to remove routes using EBGP NLRI announcements send BGP WITHDRAW messages containing a new route originator attribute that identifies an originator of a specified withdrawn route. A receiving node removes the specified route from its routing information base (RIB), and matches the originator to other paths in the RIB. Matching paths are marked as ineligible for consideration in a best path computation, thereby preventing the use of routes that are unreachable but not yet withdrawn by an originating node. The approach causes faster BGP convergence, reduces unnecessary route flapping, and alleviates unnecessary route dampening.

In other aspects, the invention encompasses a computer apparatus and a computer-readable medium configured to carry out the foregoing steps.

2.0 Approaches for Improving Convergence in Networks 2.1 Structural Elements

FIG. 1A is a block diagram of an example network context in which an embodiment may be used. A first network 102 includes an edge router 104 that is coupled through an intermediate network 106 to an edge router 110 of a second network 108. In one embodiment, a network service provider serving two or more customers owns or operates networks 102, 106, 108. For example, networks 102, 108 may be associated with two different customers of a service provider that also owns and operates network 106 as its core network.

Edge routers 104, 110 may be Cisco 7200 Series Routers from Cisco Systems, Inc., San Jose, Calif. Alternatively, edge routers 104, 110 may comprise any other router or switch suitable for use in a packet-switched network.

For purposes of illustrating a clear example, FIG. 1A is greatly simplified and illustrates only three networks and two routers. However, the techniques broadly described herein may be applied to many far more complex network configurations. Thus, FIG. 1A is intended merely to show a clear example and should not be interpreted to limit the scope of the invention.

According to one embodiment, the routers 104, 110 implement a method of improving convergence, and the networks of FIG. 1A use a path vector protocol for inter-domain communication of routes and reachability information. In one embodiment, routers 104, 110 host an operating system that includes or interoperates with one or more software elements that implement Border Gateway Protocol (BGP) for inter-domain route and reachability communication.

Periodically, router 104 issues one or more BGP UPDATE messages that advertise routes in network 102 that the router can reach. Router 110 receives the BGP UPDATE messages and inserts corresponding route information in a local route information base (RIB) that router 110 manages. As a result, over time each of routers 104, 110 build respective local RIBs that contain a complete representation of routes and reachability in the networks 102, 108.

Periodically, nodes such as routers 104, 110 that need to remove routes using EBGP NLRI announcements send BGP UPDATE or WITHDRAW messages 120 containing a route originator attribute 122 that identifies a withdrawn route and an originator of a specified withdrawn route. A receiving node removes the specified route from its routing information base (RIB), and matches the originator to other paths in the RIB. Matching paths are marked as ineligible for consideration in a best path computation, thereby preventing the use of routes that are unreachable, but not yet withdrawn by an originating node.

The approach causes faster BGP convergence, reduces unnecessary route flapping, and alleviates unnecessary route dampening. Details of the foregoing general approach are described in other sections herein.

Figure 1B:
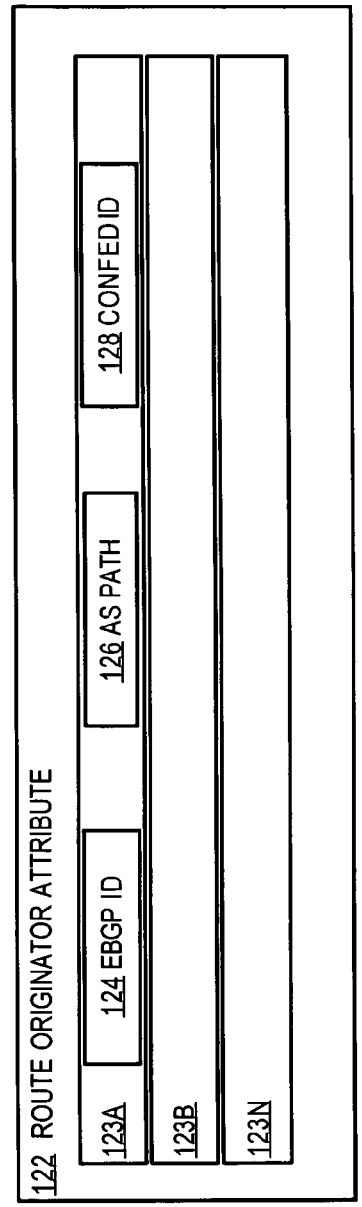
FIG. 1B is a block diagram of a route originator attribute.

FIG. 1B is a block diagram of a route originator attribute. In one embodiment, a route originator attribute 122 for a BGP UPDATE or WITHDRAW message 120 (FIG. 1A) comprises one or more type-length-value (TLV) tuples 123A, 123B, 123C, each comprising an EBGP identifier 124, an autonomous system path 126, and a confederation identifier 128. The EBGP identifier 124 identifies an EBGP node that originated the NLRI that is also carried in the UPDATE message 120. The autonomous system path value 126 identifies a path in an AS to the identified node. The confederation identifier 128 identifies a node grouping or confederation of which the identified EBGP node is a part. Thus, the elements of the route originator value collectively unambiguously identify a network node that originated the reachability information in the associated UPDATE or WITHDRAW message.

FIG. 1C is a block diagram of a software architecture of a network node that implements the approaches herein. In one embodiment, a network node such as routers 104, 110 hosts an operating system 140. The operating system 140 hosts and controls the operation of a logical stack that includes a transport control protocol (TCP) process 138 and a BGP process 130. Alternatively, process 138 may comprise an implementation of stream control transmission protocol (SCTP).

The BGP process 130 accesses and manages a local routing information base (RIB) 132. The BGP process 130 is coupled to, or includes, route origination logic 134, which comprises one or more computer program instructions or other software elements that implement the approaches of FIG. 2A, FIG. 2B, and FIG. 3. Route origination logic 134 creates one or more route originator attributes 122 for communication to peer BGP nodes in BGP UPDATE or WITHDRAW messages.

2.2 Functional Approaches 2.2.1 Sending Update Messages

FIG. 2A is a flow diagram that illustrates a high level overview of one embodiment of a method for sending an update message with a route originator attribute. A network node, such as routers 104, 110, performs the steps of FIG. 2A.

In step 202, a network node determines that the need to send an EBGP NLRI announcement exists. The announcement provides route and reachability information for a route that the network node can reach. In conventional practice without a route originator attribute, an EBGP speaker node announces reachability information in the form of BGP UPDATE messages comprising NLRI and NLRI attributes. In an embodiment, steps of FIG. 2A are performed whenever an NLRI announcement is triggered in an implementation of EBGP.

In step 204, the originating node creates a route originator attribute and appends the attribute to a BGP UPDATE message. In step 206, the update message is sent. In one embodiment, the route originator attribute is originated only by the BGP speaker that originates the NLRI from a domain or autonomous system, or by a BGP speaker that has made an advance agreement to announce NLRI on behalf of the actual originator. For example, in the case of a BGP connection between a PE node and a CE node, the PE node can send UPDATE messages with the route originator attribute on behalf of the CE node.

Additionally or alternatively, the route originator attribute may be applied to a BGP message containing NLRI based on inbound policy at a receiving node when the NLRI is received into a domain, if the attribute is not already present in the message. Such a policy-based approach allows the techniques herein to be used when the originating BGP speaker is a CE node that does not support a software implementation of the techniques.

Step 206 is intended to mean that the route originator attribute is forwarded each time that NLRI is announced to other BGP peers. This approach enables the route originator attribute information to propagate across a network and across one or more autonomous systems.

2.2.2 Sending Route Withdrawal Messages

Figure 2B:
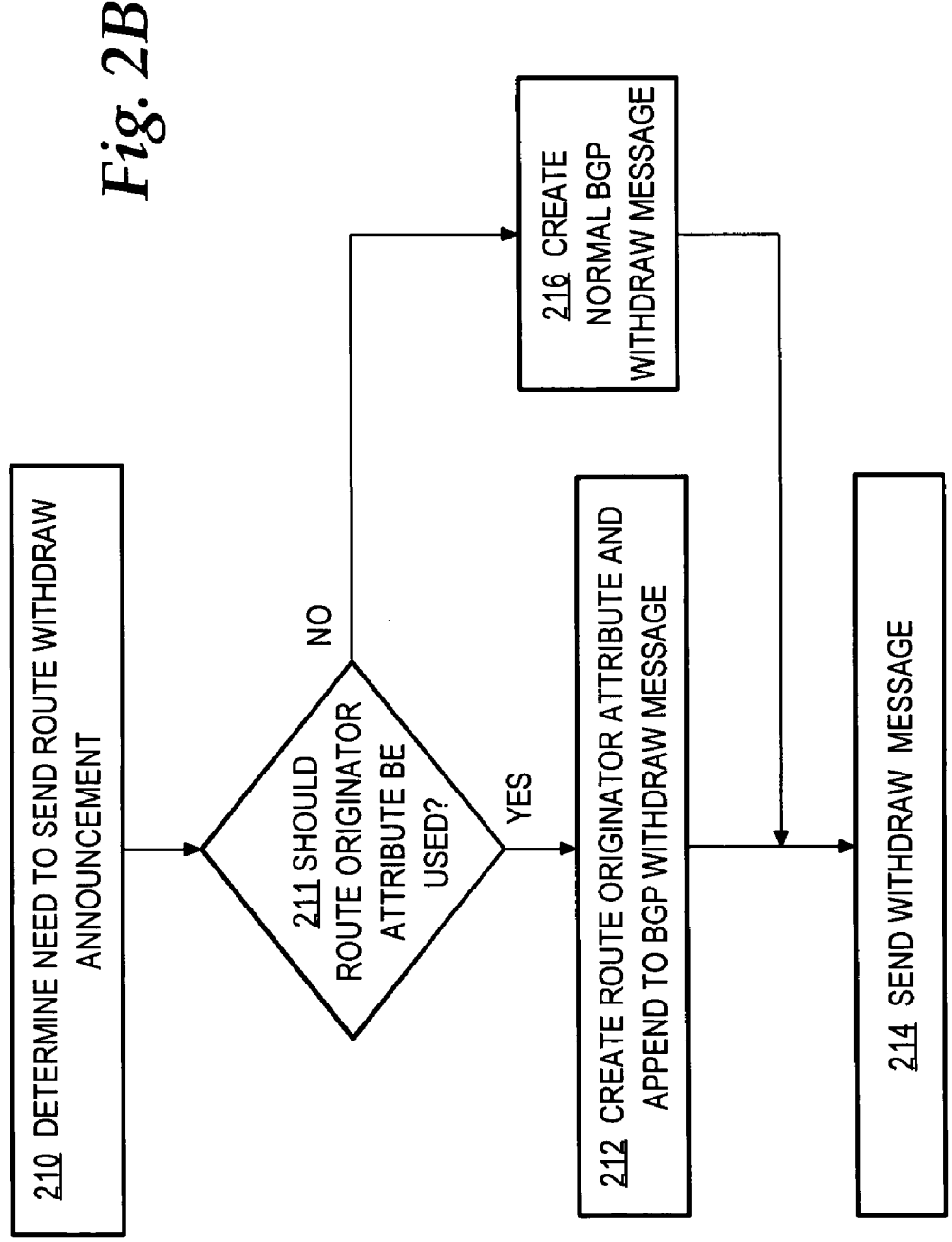
FIG. 2B is a flow diagram that illustrates a high level overview of one embodiment of a method for sending a withdraw message with a route originator attribute.

When the approach of FIG. 2A is used, a complementary approach using a new BGP WITHDRAW message format is used to withdraw NLRI and associated route originator attributes. FIG. 2B is a flow diagram that illustrates a high level overview of one embodiment of a method for sending a withdraw message with a route originator attribute. A network node, such as routers 104, 110, performs the steps of FIG. 2B.

In step 210, a node determines that the node needs to send a route withdraw announcement. Step 210 represents determining that a link, path or node is unreachable for any reason so that associated reachability information needs to be withdrawn.

In step 211, a test is performed to determine whether a route originator attribute should be used. In one embodiment, a BGP speaker that implements the approaches herein will determine that a route originator attribute should be used when a BGP neighbor to which the BGP speaker announces a BGP WITHDRAW message also implements the approaches herein. A BGP speaker node may use BGP capability negotiation approaches, which are well known in the field, to determine whether a neighbor implements the present techniques. For BGP neighbors that do not implement the present techniques, a BGP speaker node can choose to announce withdrawal information using normal BGP withdrawal mechanisms.

If the route originator attribute is not needed, then in step 216 a normal BGP WITHDRAW message is created, and the message is sent at step 214. If the route originator attribute is needed, then in step 212 a route originator attribute with appropriate values is created and appended to a BGP WITHDRAW message, which is sent at step 214. In one embodiment, the EBGP ID value 124 of the route originator attribute 122 carries an identification of a node at which a service outage has occurred within an AS that originated the NLRI. Alternatively, when a service outage occurred in an intermediate AS, the identification values 124, 128 in the route originator attributes are kept the same but the AS path value 126 is changed to match the numbers of nodes in the AS at which the outage occurred.

2.2.3 Processing Route Withdrawal Messages

FIG. 3 is a flow diagram that illustrates a high level overview of one embodiment of a method of processing, at a receiving node, a withdraw message with a route originator attribute. A network node, such as routers 104, 110, performs the steps of FIG. 3 in response to receiving a route withdrawal message that another node has sent in accordance with FIG. 2B.

In step 302, a node receives a BGP WITHDRAW message that contains a route originator attribute. The WITHDRAW message also identifies a route to withdraw in the form of an NLRI carried in the message.

At step 304, the node removes the NLRI requested in the message from the local BGP RIB of that node. For example, the NLRI is removed from route information base 132 of a node 104 as shown in FIG. 1C.

At step 306, the receiving node matches values carried in the route originator attribute and received in the BGP WITHDRAW message to one or more paths in the RIB. Matching is performed for all the other NLRI path's route originator attributes. Matching, in this context, refers to identifying all paths that share the same path as the one received in the WITHDRAW message. At step 308, the node marks matching paths as temporarily ineligible for consideration when the node performs any best path computation.

In an embodiment, the NLRI paths are made ineligible for the best path computation only for a limited time. In one approach, the NLRI paths that are marked as ineligible still must be withdrawn by normal operation of BGP, or the paths will be marked as not ineligible after a specified time. A timer process may be used to enforce remarking such paths. The use of a limited time of ineligibility protects against long-lasting "collateral damage" to the routing information if a NLRI path somehow is misidentified as infeasible. In one embodiment, NLRI paths that are made eligible after expiration of the timer, and which are not withdrawn through other mechanisms, are made eligible for the next BGP best path computation whenever that computation is scheduled.

As a result, all paths that may not be reachable, or inactive, but are not yet withdrawn by BGP neighbor nodes, cannot be selected as a possible best path. Because those paths cannot be selected as a possible best path, those paths also cannot trigger route flaps. Further, unnecessary route dampening is avoided.

2.2.4 Service Provider Business Model

Figure 4:
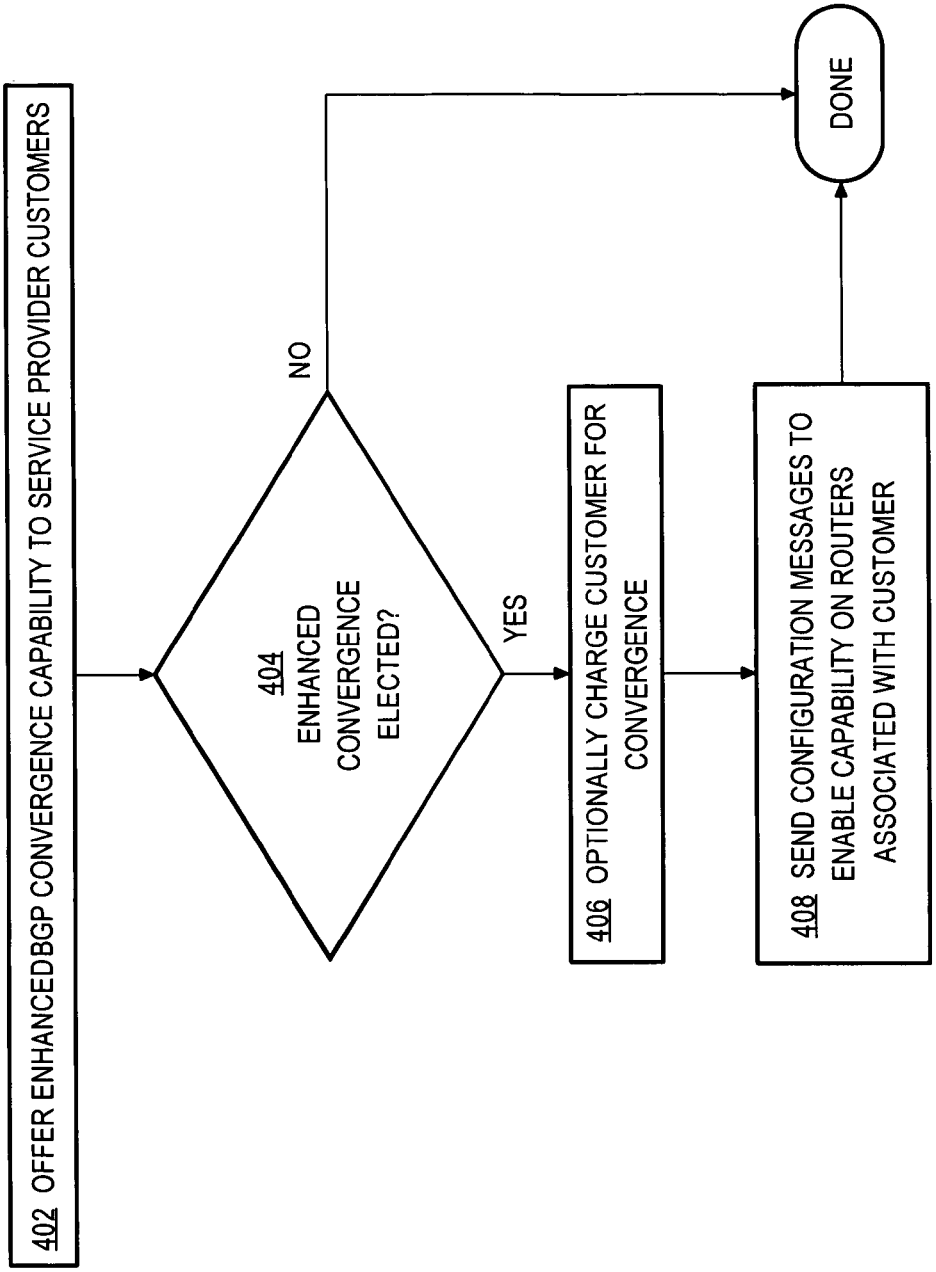
FIG. 4 is a flow diagram showing a process by which a service provider may obtain revenue from the use of the route originator attribute described herein.

FIG. 4 is a flow diagram showing a process by which a service provider may obtain revenue from the use of the route originator attribute described herein.

At step 402, a service provider offers an enhanced BGP convergence capability to service provider customers. The enhanced capability involves activating software that implements the processes of FIG. 2A, 2B on one or more routers in the service provider network that are associated with traffic flows for a particular customer that is given the offer. The offer may include a fee that is charged for activating or maintaining the capability for a set of routers or customer traffic flows.

In step 404, a test is performed to determine if the customer elected the enhanced convergence capability. If not, then the process of FIG. 4 is complete. Optionally, if a customer has elected the enhanced capability, then in step 406 the customer may be charged for the convergence process provided herein, and in step 408 one or more configuration messages are sent to enable the capability on one or more routers of the service provider that are associated with the particular customer.

Using the foregoing approach, a service provider can generate additional revenue streams on a per-customer basis by selectively activating the enhanced BGP convergence capability described herein for particular customers or flows.

3.0 Implementation Mechanisms—Hardware Overview

Figure 5:
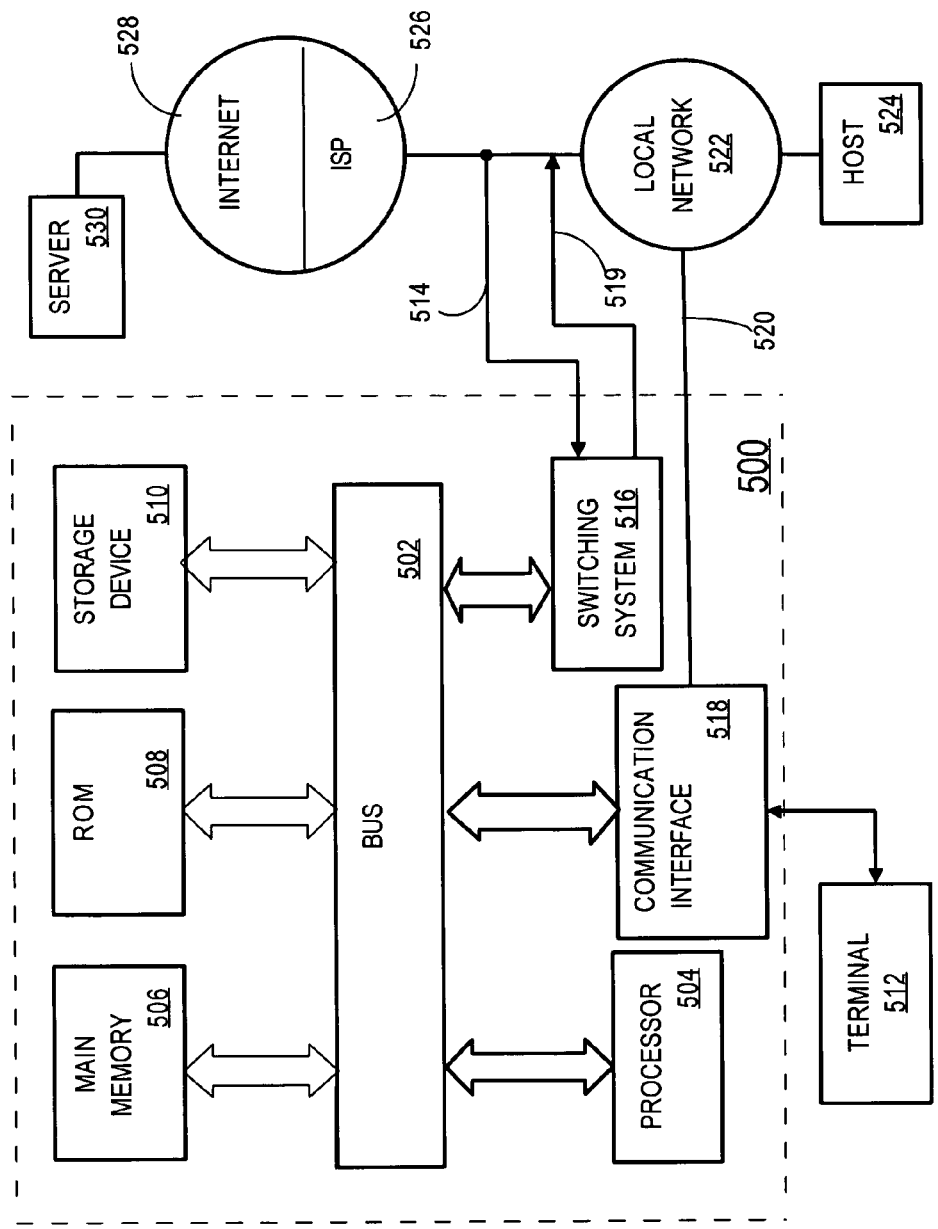
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for improving convergence in networks. According to one embodiment of the invention, improving convergence in networks is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for improving convergence in networks as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method of improving convergence in networks comprising the steps of:
    receiving a Border Gateway Protocol (BGP) UPDATE message that includes a first route originator attribute explicitly identifying, using an Exterior Border Gateway Protocol Identifer (EBGP ID), a node that originated an announcement of network layer reachability information (NLRI), wherein the first route originator attribute additionally includes one or more path identifier values, wherein the one or more path identifier values each identifies a path to the node that originated network layer reachability information;
    receiving a Border Gateway Protocol (BGP) WITHDRAW message that includes a second route originator attribute explicitly identifying, using the EBGP ID, the node, which originated a withdrawal of the network layer reachability information, wherein the second route originator attribute additionally includes the one or more path identifier values that were included in the first route originator attribute;
    removing the network layer reachability information from a local BGP route information base;
    electronically matching the one or more path identifier values from the second route originator attribute to one or more route originator attribute path identifier values stored in the route information base to result in identifying one or more matching paths;
    electronically marking the one or more matching paths as ineligible for consideration in a best path determination.

2. A method as recited in claim 1, wherein the one or more matching paths are marked as eligible for consideration in the best path determination if the one or more matching paths have not been withdrawn from the route information base after expiration of a timer.

3. A method as recited in claim 1, wherein a network node sends another BGP UPDATE message with another route originator attribute whenever the network node needs to send an exterior BGP (EBGP) network layer reachability information (NLRI) update message.

4. A method as recited in claim 1, wherein a first network node sends the BGP WITHDRAW message with the second route originator attribute whenever the first network node needs to send an EBGP NLRI withdrawal message to a neighbor BGP node that is known to implement the steps of claim 1.

5. A method as recited in claim 4, wherein the first network node determines that the neighbor BGP node implements the steps of claim 1 by negotiating one or more BGP capabilities with the neighbor BGP node at a time when the first network node establishes a BGP peering session with the neighbor BGP node.

6. A method as recited in claim 1, wherein the second route originator attribute comprises the EBGP ID, the path identifier, and a confederation identifier, wherein the EBGP ID identifies the node that originated NLRI, wherein the path identifier is an autonomous system path value that identifies a path to the node, and the confederation identifier identifies a confederation of which the node is a part.

7. A method as recited in claim 6, wherein the second route originator attribute comprises a plurality of type-length-value tuples, wherein each of the tuples comprises the EBGP ID, the autonomous system path value, and the confederation identifier.

8. A method as recited in claim 1, wherein the BGP UPDATE message or BGP WITHDRAW message is received from a first node that is a node other than a second node identified by an EBGP identifier in the originator attribute of the message.

9. A computer-readable storage device storing one or more sequences of instructions for improving convergence in networks, which instructions, when executed by one or more processors, cause the one or more processors to carry out the steps of:
    receiving a Border Gateway Protocol (BGP) UPDATE message that includes a first route originator attribute explicitly identifying, using an EBGP ID, a node that originated an announcement of network layer reachability information, wherein the first route originator attribute additionally includes one or more path identifier values, wherein the one or more path identifier values each identifies a path to the node that originated network layer reachability information;
    receiving a Border Gateway Protocol (BGP) WITHDRAW message that includes a second route originator attribute explicitly identifying, using the EBGP ID, the node, which originated a withdrawal of the network layer reachability information, wherein the second route originator attribute additionally includes the one or more path identifier values that were included in the first route originator attribute;
    removing the network layer reachability information from a local BGP route information base;
    electronically matching the one or more path identifier values from the second route originator attribute to one or more route originator attribute path identifier values stored in the route information base to result in identifying one or more matching paths;
    electronically marking the one or more matching paths as ineligible for consideration in a best path determination.

10. A computer-readable storage device as recited in claim 9, wherein the one or more matching paths are marked as eligible for consideration in the best path determination if the one or more matching paths have not been withdrawn from the route information base after expiration of a timer.

11. A computer-readable storage device as recited in claim 9, wherein a network node sends another BGP UPDATE message with another route originator attribute whenever the network node needs to send an exterior BGP (EBGP) NLRI update message.

12. A computer-readable storage device as recited in claim 9, wherein a first network node sends the BGP WITHDRAW message with the second route originator attribute whenever the first network node needs to send an EBGP NLRI withdrawal message to a neighbor BGP node that is known to implement the steps of claim 9.

13. A computer-readable storage device as recited in claim 12, wherein the first network node determines that the neighbor BGP node implements the steps of claim 9 by negotiating one or more BGP capabilities with the neighbor BGP node at a time when the first network node establishes a BGP peering session with the neighbor BGP node.

14. A computer-readable storage device as recited in claim 9, wherein second route originator attribute comprises the EBGP ID, the path identifier, and a confederation identifier, wherein the EBGP ID identifies the node that originated NLRI, wherein the path identifier is an autonomous system path value that identifies a path to the node, and the confederation identifier identifies a confederation of which the node is a part.

15. A computer-readable storage device as recited in claim 14, wherein each route originator attribute comprises a plurality of type-length-value tuples, wherein each of the tuples comprises the EBGP ID, the autonomous system path value, and the confederation identifier.

16. A computer-readable storage device as recited in claim 9, wherein the BGP UPDATE message or BGP WITHDRAW message is received from a first node that is a node other than a second node identified by an EBGP identifier in the originator attribute of the message.

17. An apparatus for improving convergence in networks, comprising:
   one or more processors;
   means for receiving a Border Gateway Protocol (BGP) UPDATE message that includes a first route originator attribute explicitly identifying, using an EBGP ID, a node that originated an announcement of network layer reachability information, wherein the first route originator attribute additionally includes one or more path identifier values, wherein the one or more path identifier values each identifies a path to the node that originated network layer reachability information;
   means for receiving a Border Gateway Protocol (BGP) WITHDRAW message that includes a second route originator attribute explicitly identifying, using the EBGP ID, the node, which that originated a withdrawal of the network layer reachability information, wherein the second route originator attribute additionally includes the one or more path identifier values that were included in the first route originator attribute;
   means for removing the network layer reachability information from a local BGP route information base;
   means for electronically matching the one or more path identifier values from the second route originator attribute to one or more route originator attribute path identifier values stored in the route information base to result in identifying one or more matching paths;
   means for electronically marking the one or more matching paths as ineligible for consideration in a best path determination.

18. An apparatus as recited in claim 17, wherein the one or more matching paths are marked as eligible for consideration in the best path determination if the one or more matching paths have not been withdrawn from the route information base after expiration of a timer.

19. An apparatus as recited in claim 17, wherein a network node sends another BGP UPDATE message with another route originator attribute whenever the network node needs to send an exterior BGP (EBGP) NLRI update message.

20. An apparatus as recited in claim 17, wherein a first network node sends the BGP WITHDRAW message with the second route originator attribute whenever the first network node needs to send an EBGP NLRI withdrawal message to a neighbor BGP node that is known to comprise the apparatus of claim 17.

21. An apparatus as recited in claim 20, wherein the first network node determines that the neighbor BGP node comprises the apparatus of claim 17 by negotiating one or more BGP capabilities with the neighbor BGP node at a time when the first network node establishes a BGP peering session with the neighbor BGP node.

22. An apparatus as recited in claim 17, wherein second route originator attribute comprises the EBGP ID, the path identifier, and a confederation identifier, wherein the EBGP ID identifies the node that originated NLRI, wherein the path identifier is an autonomous system path value that identifies a path to the node, and the confederation identifier identifies a confederation of which the node is a part.

23. An apparatus as recited in claim 22, wherein second route originator attribute comprises a plurality of type-length-value tuples, wherein each of the tuples comprises the EBGP ID, the autonomous system path value, and the confederation identifier.

24. An apparatus for improving convergence in networks, comprising:
   a network interface that is coupled to the data network for receiving one or more packet flows therefrom;
   a processor;
   a computer-readable storage device storing one or more stored sequences of instructions which, when executed by the processor, cause the processor to carry out the steps of:
      receiving a Border Gateway Protocol (BGP) UPDATE message that includes a first route originator attribute explicitly identifying, using an EBGP ID, a node that originated an announcement of network layer reachability information, wherein the first route originator attribute additionally includes one or more path identifier values, wherein the one or more path identifier values each identifies a path to the node that originated network layer reachability information;
      receiving a Border Gateway Protocol (BGP) WITHDRAW message that includes a second route originator attribute explicitly identifying, using the EBGP ID, the node which originated a withdrawal of the network layer reachability information, wherein the second route originator attribute additionally includes the one or more path identifier values that were included in the first route originator attribute;
      removing the network layer reachability information from a local BGP route information base;
      electronically matching the one or more path identifier values from the second route originator attribute to one or more route originator attribute path identifier values stored in the route information base to result in identifying one or more matching paths;

electronically marking the one or more matching paths as ineligible for consideration in a best path determination.

25. An apparatus as recited in claim 24, wherein the one or more matching paths are marked as eligible for consideration in the best path determination if the one or more matching paths have not been withdrawn from the route information base after expiration of a timer.

26. An apparatus as recited in claim 24, wherein a network node sends another BGP UPDATE message with another route originator attribute whenever the network node needs to send an exterior BGP (EBGP) NLRI update message.

27. An apparatus as recited in claim 24, wherein a first network node sends the BGP WITHDRAW message with the second route originator attribute whenever the first network node needs to send an EBGP NLRI withdrawal message to a neighbor BGP node that is known to implement the steps of claim 24.

28. An apparatus as recited in claim 27, wherein the first network node determines that the neighbor BGP node implements the steps of claim 24 by negotiating one or more BGP capabilities with the neighbor BGP node at a time when the first network node establishes a BGP peering session with the neighbor BGP node.

29. An apparatus as recited in claim 24, wherein the second route originator attribute comprises the EBGP ID, the path identifier value, and a confederation identifier, wherein the EBGP ID identifies the node that originated NLRI, wherein the path identifier is an autonomous system path value that identifies a path to the node, and the confederation identifier identifies a confederation of which the node is a part.

30. An apparatus as recited in claim 29, wherein the second route originator attribute comprises a plurality of type-length-value tuples, wherein each of the tuples comprises the EBGP ID, the autonomous system path value, and the confederation identifier.

* * * * *

UNITED STATES PATENT AND TRADEMARK OFFICE
CERTIFICATE OF CORRECTION

| | | |
|---|---|---|
| PATENT NO. | : 7,656,819 B2 | Page 1 of 1 |
| APPLICATION NO. | : 11/267865 | |
| DATED | : February 2, 2010 | |
| INVENTOR(S) | : Patel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 641 days.

Signed and Sealed this

Twenty-eighth Day of December, 2010

David J. Kappos
*Director of the United States Patent and Trademark Office*